US009779188B1

(12) United States Patent
Li et al.

(10) Patent No.: US 9,779,188 B1
(45) Date of Patent: Oct. 3, 2017

(54) HARMONIC BALANCE ANALYSIS MEMORY USAGE ESTIMATION

(71) Applicant: Cadence Design Systems, Inc., San Jose, CA (US)

(72) Inventors: Yue Li, Milpitas, CA (US); Vuk Borich, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 620 days.

(21) Appl. No.: 14/476,456

(22) Filed: Sep. 3, 2014

(51) Int. Cl.
*G06F 17/50* (2006.01)
*G06F 17/30* (2006.01)

(52) U.S. Cl.
CPC .... *G06F 17/5009* (2013.01); *G06F 17/30286* (2013.01)

(58) Field of Classification Search
CPC .......................... G06F 17/5018; G06F 17/5022
USPC ........................................................ 703/2, 14
See application file for complete search history.

(56) References Cited

U.S. PATENT DOCUMENTS 6,154,716 A * 11/2000 Lee ..................... G06F 17/5036
703/14
8,131,521 B1 * 3/2012 Karanko ............. G06F 17/5036
703/17

* cited by examiner

*Primary Examiner* — Andy Ho
(74) *Attorney, Agent, or Firm* — Andrews Kurth Kenyon LLP

(57) ABSTRACT

Aspects of the present invention provide a system and method to estimate the amount of memory a harmonic balance analysis will require by measuring the memory allocated for a circuit database for a circuit undergoing harmonic balance analysis, determining the problem size of the harmonic balance analysis based on the information in the database, calculating the amount of memory for matrices, solution and auxiliary vectors needed for the harmonic balance analysis, and estimating the additional memory needed to complete a Newton iteration of the harmonic balance analysis using previously compiled statistical distributions. The total needed memory will be the sum of the measured, calculated, and estimated needed memory. A lower and an upper bound estimation of the total memory usage is provided. This information can be used by the circuit or system designer and/or an analysis or simulation tool for planning the computing resources necessary to execute the harmonic balance analysis.

19 Claims, 3 Drawing Sheets

100

200

300

410

HARMONIC BALANCE ANALYSIS MEMORY USAGE ESTIMATION

BACKGROUND

Aspects of the present invention relate generally to integrated circuit designs, and in particular to techniques for simulation and test of such designs.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis, for example using harmonic balance analysis to calculate the periodic steady-state for circuits that include non-linear elements. Harmonic balance analysis is a method used to simulate circuits that include non-linear elements, for example mixers, power amplifiers, and oscillators, by calculating the periodic steady-state response of non-linear differential equations for the circuits. However, such calculations for a large and complicated circuit design often require a substantial amount of resources, including both memory and processing power. Designers often have to request access to special resources in order to complete the harmonic balance analysis. Unfortunately, the amount of memory the harmonic balance analysis will use is not known until the simulation is complete. On some occasions, if the designer does not request sufficient memory or processing power, the analysis will fail and many hours, sometimes days, of simulation will be lost. However, due to the high demand for these resources, designers are discouraged from requesting memory in excess of their requirements where requesting too much memory would leave such resources idle.

Accordingly, there is a need in the art for a system to provide an accurate estimate of the potential memory usage when planning computing resources needed during a harmonic balance analysis.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Aspects of the present invention estimate the amount of memory a harmonic balance analysis will require by initiating a harmonic balance analysis, but stopping the analysis after the circuit and analysis database has been built. The memory allocated for the database is then measured. The problem size is defined by the information stored in the database, such as the number of circuit nodes and the number of harmonics. Based on the problem size, the memory needed for the matrices, solution, and auxiliary vectors used in the harmonic balance analysis is calculated. Additional memory that will be allocated during the Newton iteration of the harmonic balance analysis is estimated based on the problem size and a previously compiled statistical distribution. The total memory estimated is the total memory allocated and estimated including the allocated memory for the database, the calculated memory for the matrices and vectors, and the estimated memory for the Newton iteration. An analysis or simulation tool can use this information to plan for the computing resources necessary to execute the harmonic balance analysis.

Figure 1:
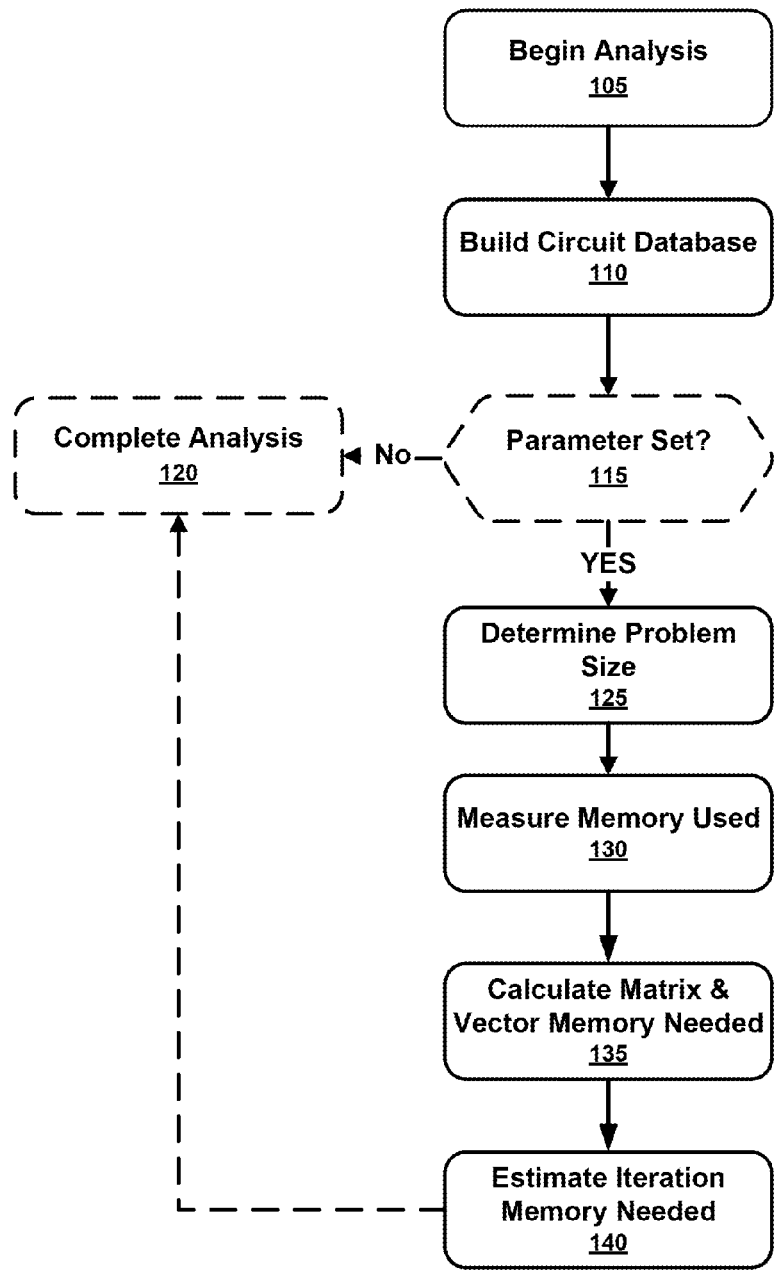
FIG. 1 illustrates an exemplary method for calculating the memory needed to complete a harmonic balance analysis according to an embodiment of the present invention.

FIG. 1 illustrates an exemplary method 100 for calculating the memory needed to complete a harmonic balance analysis according to an embodiment. As shown in FIG. 1, preliminarily a harmonic balance analysis for a circuit or system design may be initiated (block 105). The analysis will begin by building a circuit database for the circuit design undergoing harmonic balance analysis (block 110). Then, based on the information stored in the database, the total memory used to build the database can be measured (block 130). Based on the information stored in the database, the problem size, defined by the information stored in the database such as the number of circuit nodes and the number of harmonics, can be defined (block 125). Then, based on the problem size, the memory needed for matrices and solution and auxiliary vectors, to complete the harmonic balance analysis, is calculated (block 135).

A typical harmonic balance analysis consists of two phases: a preliminary phase, which may include DC analysis and/or transient analysis; and a Newton iteration phase. If a parameter is set that indicates that the total memory usage should be estimated (block 115), then both the preliminary phase and the Newton iteration phase may be completely omitted. However, if the parameter is not set (block 115), then the harmonic balance analysis will continue without calculating the necessary memory (block 120) until the analysis is complete. The user may set the parameter, for example, by requesting the total memory calculation or setting a mode for the analysis that includes providing an estimate. Additionally, as shown in FIG. 1, setting a parameter may be optional. For example, it may be the default setting that the harmonic balance analysis will calculate the total memory necessary to complete the analysis on the provided design. Or the method for calculating the memory needed to complete a harmonic balance analysis may be optionally initiated, so that once the method 100 is initiated a simulator will begin the analysis (block 105) and then once the circuit database is built (block 110), the memory usage will be calculated.

As shown in FIG. 1, the problem size is determined (block 125) and the memory for the circuit and analysis database is measured (block 130) after the database is built. Part of the memory used in the harmonic balance analysis, including memory needed for matrices and vectors, is then calculated based on the problem size (block 135). The determined problem size will then be used to estimate the additional memory that will be allocated in the Newton iteration (block 140).

According to an aspect of an embodiment, the total memory needed is divided into three parts, the memory for the circuit and analysis database, the memory for harmonic balances matrices and vectors, and the memory that will be allocated during the Newton iteration. As previously noted, the first two parts of the needed memory can be either measured or calculated. The third part of the needed memory is dominated by the generalized minimum residual (GMRES) linear solver and strongly correlated with the maximum number of GMRES iterations per non-linear phase iteration. Based on previous statistical studies, a normalized average GMRES memory usage stored in the simulator such that based on the problem size, the estimated memory for the Newton iteration phase is given as the normalized average GMRES memory usage times the problem size. According to an aspect of an embodiment, the provided normalized average GMRES memory usage is determined based on a statistical analysis of the total memory used in other harmonic balance analyses of various circuit and system designs. For example, in an aspect of an embodiment, over 200 cases of harmonic balance analyses of various circuit and system designs are used to determine the normalized average GMRES memory usage. According to an aspect of an embodiment, the normalized average GMRES memory usage may be provided as part of the simulator, for example as part of an Electronic Design Automation (EDA) harmonic balance analysis tool. Periodic updates to the usage factor table may be provided by the tool creator as available.

The total memory estimate may then be calculated in accordance with Equation 1:

estimated memory=measured database memory+ calculated matrix and vector memory+(problem size*normalized average GMRES memory usage)   EQ. 1

According to an aspect of an embodiment, for designs that require 500 MB of memory or more to complete the harmonic balance analysis, the estimated memory usage calculated according to the methods presented herein will be accurate with a plus/minus 30% range 80% of the time. Therefore upper and lower bounds of the memory estimate may be calculated as the plus and minus 30% of the estimated memory.

According to an aspect of an embodiment, once the total memory needed has been calculated (block 140), the analysis may continue (block 115). According to an aspect of an embodiment, once the total memory needed has been calculated (block 140), the calculation may be provided to a simulator so that the necessary resources can be allocated to execute the complete harmonic balance analysis (not shown).

According to an aspect of an embodiment, once the total memory needed has been calculated (block 140), the analysis may exit. According to an aspect of an embodiment, once the total memory needed has been calculated (block 140), the calculation may be displayed or otherwise output or provided to the designer or simulation controller for future use (not shown). According to an aspect of an embodiment, once the total memory needed has been provided to the user, the user may utilize the provided information to request the necessary resources and then initiate the complete analysis with memory calculation parameter turned off (not shown).

Figure 2:
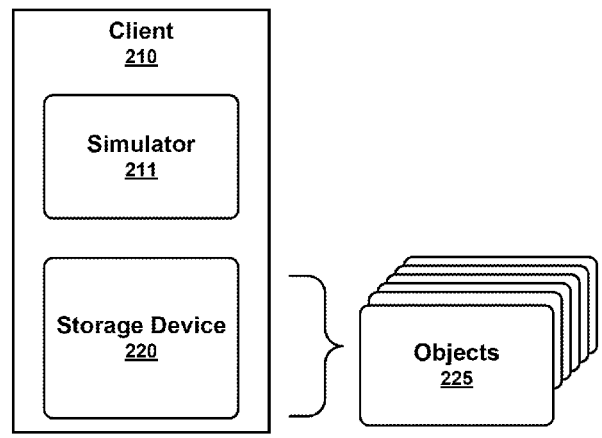
FIG. 2 is a simple block diagram illustrating components of an exemplary system according to an embodiment of the present invention.

A user may access a simulator or simulation center for performing harmonic balance analysis in a standalone system, a client-server environment, or a networked environment. FIG. 2 is a simple block diagram illustrating components of an exemplary system 200 according to an embodiment. As shown in FIG. 2, a system 200 may comprise a client 210 executing a simulator 211 and having a memory storage 220. The client 210 may be any computing system that executes a simulator 211 or otherwise facilitates access to memory storage 220, for example a personal computer. The client 210 may include a processor that performs a method in accordance with the disclosed embodiments. Such a client would be part of an overall simulation system in accordance with the disclosed embodiments.

Hardware models, instruction sets, software packages, instances of the modeled components, state information for the modeled components, calculation matrices and vectors, and other objects 225 used by the simulator 211 may be stored in memory storage 220. A user may access the objects 225 stored in memory storage 220 with the client 210 via the simulator 211, where the simulator 211 is capable of accessing memory storage 220 and displaying the objects 225 and the data associated with the simulation. The simulator 211 may include a user interface, for example a program, application or middleware that acts as a frontend to and facilitates access to objects in memory storage 220. The simulator 211 may facilitate control over and observability into the simulation of the components implemented in a virtual platform using the display and edit tools and procedures described herein. The user may interact with the simulator 211 through a number of input devices, such as by inputting a selection as with a mouse or inputting a request as with a keyboard. The user may observe the simulation results on an output device or display. The simulator 211 may run in an application window controlled by the user.

As shown in FIG. 2, a client 210 may be a stand-alone system, as may be of particular interest where the components being simulated are highly confidential. Additionally, according to an aspect of an embodiment as shown in FIG. 3, a client 310 may be part of a networked environment.

Figure 3:
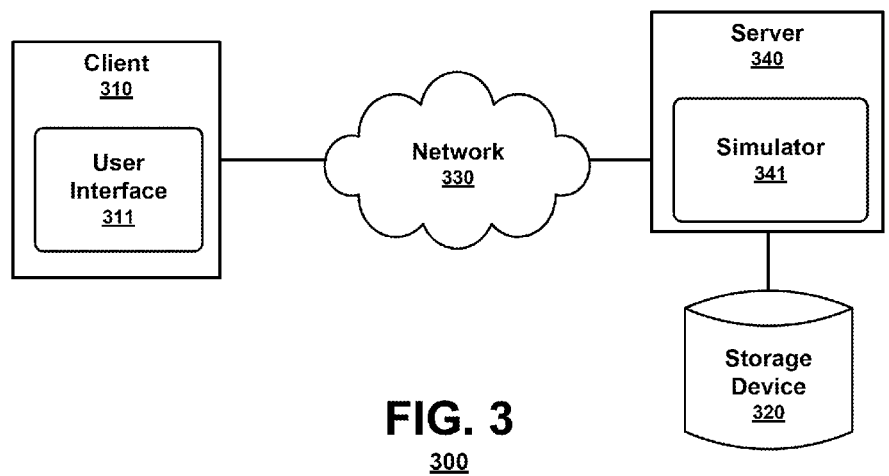
FIG. 3 is a simple block diagram illustrating components of an exemplary system according to an embodiment of the present invention.

FIG. 3 is a simple block diagram illustrating components of an exemplary system 300 according to an embodiment. As shown in FIG. 3, system 300 may include a client 310 having a user interface 311. The client 310 may be connected to a server 340 via a network 330. The simulator 341, which in this embodiment is located at server 340, may have access to storage device 320 storing hardware models, instruction sets, software packages, instances of the modeled components, state information for the modeled components, calculation matrices and vectors, and other objects utilized by the simulator 341. The server 340 may include a processor that performs a method in accordance with the disclosed embodiments. Such a server then would be part of an overall simulation system in accordance with the disclosed embodiments.

A user may access a simulator 341 at the server 340 via the client 310 having a user interface 311 capable of accessing and displaying the components implemented as part of a virtual platform and the results of the simulation of those components. The client 310 may be any computing system that facilitates the user accessing storage device 320, for example a personal computer. The network 330 may be a wired or wireless network that may include a local area network (LAN), a wireless area network (WAN), the Internet, or any other network available for accessing storage device 320 from the client 310.

The server 340 may be a network server accessible to the client 310 via the network 330 that may manage access to storage device 320. The user interface 311 may receive instructions regarding a simulation from the user and utilizing the objects stored in memory storage 320, facilitate a display of the simulation or the information gathered during the simulation. Multiple different clients (not shown) may access storage device 320 via the network 330 and request access to the storage device 320.

In another networked environment, the simulator may be executed on a network capable client and access one or more storage devices via a network and communications server.

Figure 4:
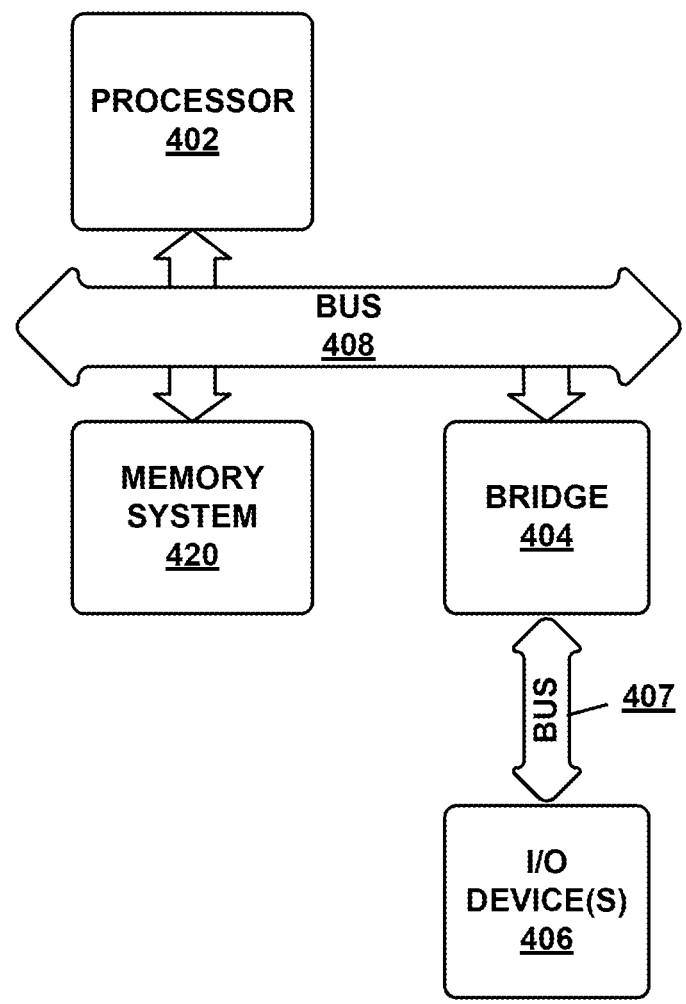
FIG. 4 is a simple block diagram illustrating components of an exemplary client according to an embodiment of the present invention.

FIG. 4 is a simple block diagram illustrating components of an exemplary client 410 according to an embodiment of the present invention. As shown in FIG. 4, the client 410 configured to execute the simulator as described herein may include a processor 402, a memory system 420 and one or more input/output (I/O) devices 406 in communication. The communication can be implemented in a variety of ways and may include one or more computer buses 407, 408 and/or bridge devices 404 as shown in FIG. 4. The I/O devices 406 can include network adapters and/or mass storage devices from which the client 410 can receive commands for executing the simulation.

As shown in FIG. 2, a client 410 may be a stand-alone system, as may be of particular interest where the components being simulated are highly confidential. Additionally, according to an aspect of an embodiment as shown in FIG. 3, a client 410 may be part of a networked environment.

Although described primarily with reference to estimating memory usage of the harmonic balance analysis, other analyses and estimates are also considered. For example, dependent analyses, such as noise and other small signaled analysis may be included.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIG. 1 does not necessarily imply a particular order or sequence of events, nor is it intended to exclude other possibilities. For example, the operations depicted may occur in another order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for estimating a total memory space required to complete a harmonic balance analysis for a circuit design, the method comprising:
building, with a computing device, a circuit database storing components of the circuit design for harmonic balance analysis;
measuring memory used by the circuit database;
determining a problem size for the harmonic balance analysis based on the circuit database;
calculating memory needed for matrices, solution and auxiliary vectors for the harmonic balance analysis for the design based on the problem size;
estimating memory needed by a GMRES solver based on the problem size; and
adding the measured memory, the calculated memory, and the estimated memory to identify a total memory estimate to complete the harmonic balance analysis.

2. The method of claim 1, wherein said estimating further comprises: referencing historical statistic information of memory allocation during a plurality of previously completed harmonic balance analyses.

3. The method of claim 1, wherein said estimating further comprises:
multiplying the problem size by a built-in normalized average GMRES memory usage.

4. The method of claim 3, wherein said normalized average GMRES memory usage is based on historical statistic information of memory allocation during a plurality of previously completed harmonic balance analyses.

5. The method of claim 3, wherein said historical statistic information is stored as a number calculated as the normalized average GMRES memory usage based on the memory allocated during a plurality of previously completed harmonic balance analyses.

6. The method of claim 5, wherein said number is provided with a tool for performing harmonic balance analysis.

7. The method of claim 1, further comprising: detecting that an analysis parameter has been set that indicates the total memory allocation will be calculated.

8. The method of claim 1, wherein the estimating comprises calculating an upper bound estimate and a lower bound estimate of necessary memory.

9. The method of claim 8, wherein the upper bound is thirty percent more than the estimated memory and the lower bound is thirty percent less than the estimated memory.

10. A system comprising:
a memory for use during a harmonic balance analysis of a circuit design; and
a processor configured to simulate the design by:
determining a problem size for the harmonic balance analysis based on a circuit database;
calculating memory needed for matrices, solution and auxiliary vectors for the harmonic balance analysis for the design based on the problem size;

estimating memory needed by a GMRES solver based on the problem size; and adding a measured memory, the calculated memory, and the estimated memory to identify a total memory estimate to complete the harmonic balance analysis.

11. The system of claim 10, wherein said estimating further comprises: referencing historical statistic information calculated from memory allocated during a plurality of previously completed harmonic balance analyses.

12. The system of claim 10, wherein said estimating further comprises: multiplying the problem size by a built-in normalized average GMRES memory usage.

13. The system of claim 10, wherein said processor is further configured to detect that an analysis parameter has been set to calculate the total memory allocation.

14. The system of claim 10, wherein the estimating comprises calculating an upper bound estimate and a lower bound estimate of necessary memory.

15. A non-transitory computer readable medium storing instructions that when implemented on a processor, perform a method for estimating a total memory space required to complete a harmonic balance analysis for a circuit design, the method comprising:

building, with a computing device, a circuit database storing components of the circuit design for harmonic balance analysis;

measuring memory used by the circuit database;

determining a problem size for the harmonic balance analysis based on the circuit database;

calculating memory needed for matrices, solution and auxiliary vectors for the harmonic balance analysis for the design based on the problem size;

estimating memory needed by a GMRES solver based on the problem size; and adding the measured memory, the calculated memory, and the estimated memory to identify a total memory estimate to complete the harmonic balance analysis.

16. The non-transitory computer readable medium of claim 15, wherein said estimating further comprises: referencing historical statistic information calculated from memory allocated during a plurality of previously completed harmonic balance analyses.

17. The non-transitory computer readable medium of claim 15, wherein said estimating further comprises:

multiplying the problem size by a built-in normalized average GMRES memory usage.

18. The non-transitory computer readable medium of claim 15, further comprising: detecting that an analysis parameter has been set to calculate the total memory allocation.

19. The non-transitory computer readable medium of claim 15, further comprising determining an upper bound estimate and a lower bound estimate of the estimated memory.

* * * * *